(12) United States Patent
Kumar et al.

(10) Patent No.: US 12,449,634 B2
(45) Date of Patent: Oct. 21, 2025

(54) INTER-PUPILLARY DISTANCE ADJUSTMENT DEVICE

(71) Applicant: Tonbo Imaging Pte. Ltd., Singapore (SG)

(72) Inventors: Ankit Kumar, Bangalore (IN); Kondangi Lakshmikumar Arvind, Singapore (SG); Nelaji Mohanrao Sudarshan, Bangalore (IN)

(73) Assignee: Tonbo Imaging Pte. Ltd., Singapore (SG)

( * ) Notice: Subject to any disclaimer, the term of this patent is extended or adjusted under 35 U.S.C. 154(b) by 576 days.

(21) Appl. No.: 18/051,064

(22) Filed: Oct. 31, 2022

(65) Prior Publication Data
US 2024/0142750 A1    May 2, 2024

(51) Int. Cl.
*G02B 7/12* (2021.01)
*G02B 7/00* (2021.01)

(52) U.S. Cl.
CPC ............... *G02B 7/12* (2013.01); *G02B 7/002* (2013.01)

(58) Field of Classification Search
CPC .................................. G02B 7/12; G02B 7/002

USPC ........................................................... 359/399
See application file for complete search history.

(56) References Cited

U.S. PATENT DOCUMENTS

| | | | | |
|---|---|---|---|---|
| 6,986,726 | B2 * | 1/2006 | Simon ..................... | F16H 3/663 475/340 |
| 2010/0067106 | A1 * | 3/2010 | Woker ..................... | G02B 7/12 359/412 |
| 2013/0094081 | A1 * | 4/2013 | Chang ..................... | G02B 23/18 359/481 |
| 2016/0349480 | A1 * | 12/2016 | Franzini ................... | G02B 7/12 |

\* cited by examiner

*Primary Examiner* — Sharrief I Broome
(74) *Attorney, Agent, or Firm* — Kolisch Hartwell, P.C.

(57) ABSTRACT

The present disclosure provides a device for adjusting inter-pupillary distance between eyepieces of imaging systems. The device includes a pinion gear. The pinion gear is mounted on a first pin. The device includes two carrier plates. Each of the two carrier plates having gear teeth on a first portion of a side. The gear teeth on the two carrier plates are in mesh with the pinion gear. The two carrier plates are positioned parallel and opposite to one another. The device includes two focal plane arrays. Each of the two focal plane arrays is rigidly affixed with a carrier plate of the two carrier plates and movably supported over other carrier plate of the two carrier plate. The device enables inter-pupillary distance adjustment between eyepieces without causing skew or distortion of image.

18 Claims, 7 Drawing Sheets

INTER-PUPILLARY DISTANCE ADJUSTMENT DEVICE

TECHNICAL FIELD

The present disclosure relates to the field of imaging systems. In particular, the present disclosure relates to a device for inter-pupillary distance adjustment between eyepieces of an imaging system.

BACKGROUND

Binoculars are commonly used for viewing distant objects. Binoculars allow users to use both eyes while viewing the distant objects. In order to accommodate different individuals, the inter-pupillary distance or inter-pupil distance is adjusted in a hinged arrangement. In hinged arrangement, the two optical telescopes of the binocular are pivoted about the hinge. The inter-pupillary distance is adjusted by flattening or sharpening the angle subtended by the hinge arms of the binocular telescopes. This adjustment mechanism works with satisfactory results in conventional optical systems where the scenes are projected directly onto the human eye. This is due to the fact that the human eye does not know the angle that the image is coming in on. Also, at least for the visible region of the electromagnetic spectrum, the eye is orientation independent and this way no distortions occur.

However, things are very different when focal plane arrays are used as detectors in imaging systems or more particularly in infrared imaging systems. In such systems, adopting the hinged-mechanism approach, the adjustment will correspondingly affect the rectilinear focal plane arrays at each of the telescopes. The original horizontal orientation of the focal plane arrays will be skewed of axis, in respect of each one to the other. Further, the horizontal edges of these focal plane arrays will not be along a single horizontal line. This results in considerable distortion, able to make the focal plane arrays actually unusable. The human eye being unable to detect infrared radiation, the infrared imagers require focal plane arrays onto which to project and display the processed infrared images. These focal plane arrays are rectilinear in shape and each one of them is positioned at the focal plane of the corresponding telescopic element. For accurate and distortion free imaging, the horizontal edges of both focal plane arrays must lie onto the same horizontal line. Further, this condition must be maintained for the entire range of the inter-pupillary distance adjustment.

In light of the above stated discussion, there is a need for a device which overcomes the above stated disadvantages.

SUMMARY

In an aspect, the present disclosure provides a device for adjusting inter-pupillary distance between eyepieces. The device includes a pinion gear. The pinion gear is mounted on a first pin of a plurality of pins. The pinion gear rotates about a first axis. The device includes a plurality of carrier plates. Each of the plurality of carrier plates has a gear teeth on a first portion of a side. The gear teeth on the plurality of carrier plates are in mesh with the pinion gear. The device includes a plurality of focal plane arrays. Each of the plurality of focal plane arrays is rigidly affixed with a first carrier plate of the plurality of carrier plates and movably supported over a second carrier plate of the plurality of carrier plates. The device includes a support plate for supporting the pinion gear. The device enables inter-pupillary distance adjustment between eyepieces without causing skew or distortion of image.

In another aspect, the present disclosure provides a device for adjusting inter-pupillary distance between eyepieces. The device includes a pinion gear. The pinion gear is mounted on a first pin of a plurality of pins. The pinion gear rotates about a first axis. The device includes a plurality of carrier plates. Each of the plurality of carrier plates has a gear teeth on a first portion of a side. The gear teeth on the plurality of carrier plates are in mesh with the pinion gear. The plurality of carrier plates are positioned parallel and opposite to one another. Rotation of the pinion gear provides rectilinear motion of same magnitude to the plurality of carrier plates in opposite direction to one another. Each of the plurality of carrier plates includes a plurality of slots. The device includes a plurality of focal plane arrays. Each of the plurality of focal plane arrays is rigidly affixed with a first carrier plate of the plurality of carrier plates and movably supported over a second carrier plate of the plurality of carrier plates. The device includes a plurality of telescopic elements. Each of the plurality of telescopic elements is mounted on a focal plane array of the plurality of focal plane arrays. The device includes a support plate. The support plate includes a plurality of pins. Each of the plurality of pins is received in a slot of the plurality of slots of a carrier plate of the plurality of carrier plates. The device enables inter-pupillary distance adjustment between eyepieces without causing skew or distortion of image.

In an embodiment of the present disclosure, the plurality of carrier plates are positioned parallel and opposite to one another. Rotation of the pinion gear provides rectilinear motion of same magnitude to the plurality of carrier plates in opposite direction to one another.

In an embodiment of the present disclosure, the support plate includes a plurality of pins. Each of the plurality of pins is received in a slot of the plurality of slots of a carrier plate of the plurality of carrier plates.

In an embodiment of the present disclosure, each of the plurality of carrier plates includes a plurality of slots.

In an embodiment of the present disclosure, length of the plurality of slots on each of the plurality of carrier plates determines total travel of inter-pupillary distance adjustment. Each of the plurality of carrier plates includes a plurality of holes.

In an embodiment of the present disclosure, the plurality of carrier plates include a first carrier plate and a second carrier plate. The plurality of focal plane arrays includes a first focal plane array and a second focal plane array.

In an embodiment of the present disclosure, the device includes a thumb screw. The thumb screw facilitates to lock inter-pupillary distance between eyepieces at desired position.

In an embodiment of the present disclosure, the plurality of pins and the plurality of slots collectively enable limits of inter-pupillary distance adjustment. The first pin is rigidly affixed on the support plate.

In an embodiment of the present disclosure, each of the plurality of focal plane arrays includes one or more pins on a first side. The one or more pins on each of the plurality of focal plane arrays are received in a slot of the plurality of slots of a carrier plate of the plurality of carrier plates.

BRIEF DESCRIPTION OF THE FIGURES

Figure 1A:
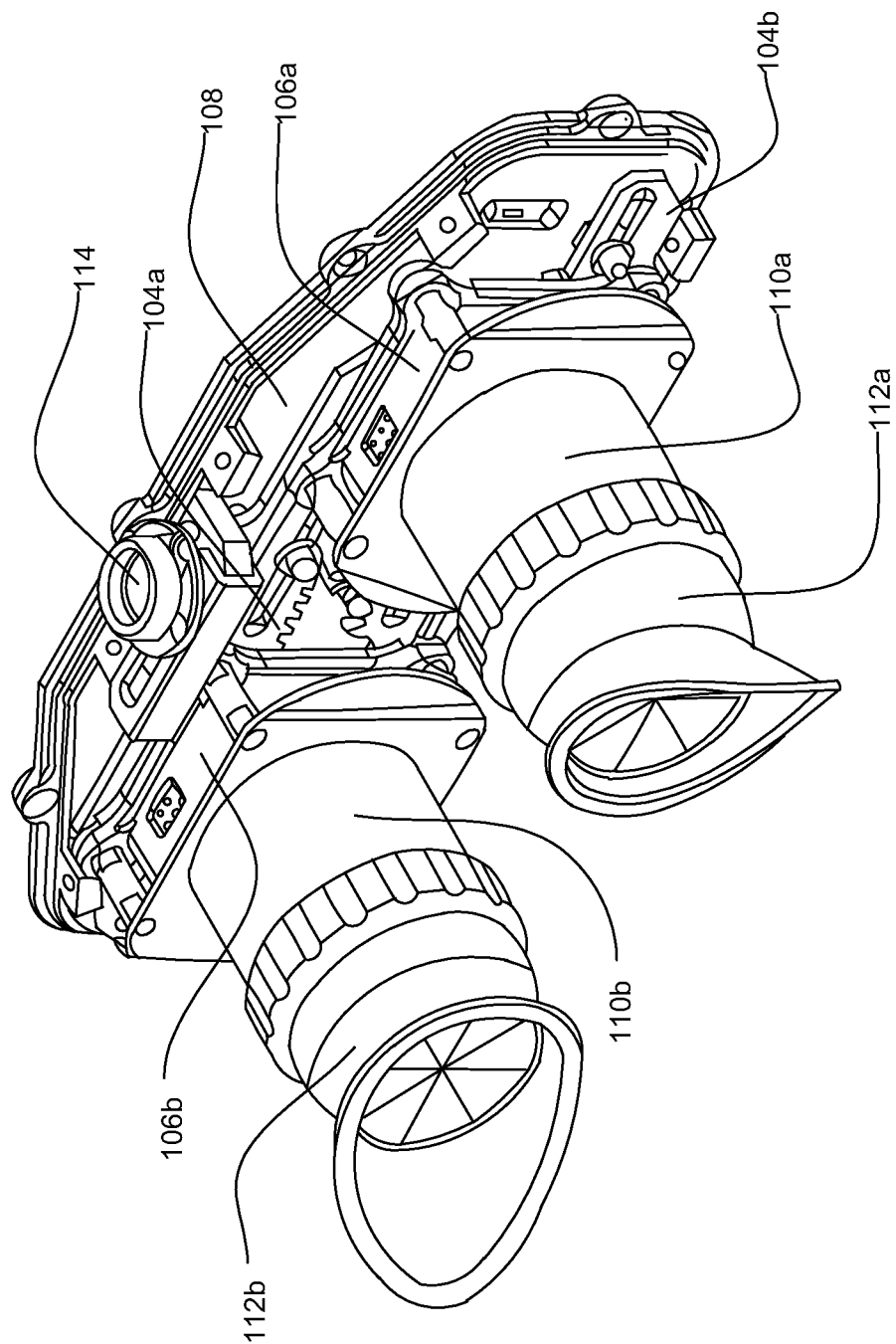
Figure 1B:
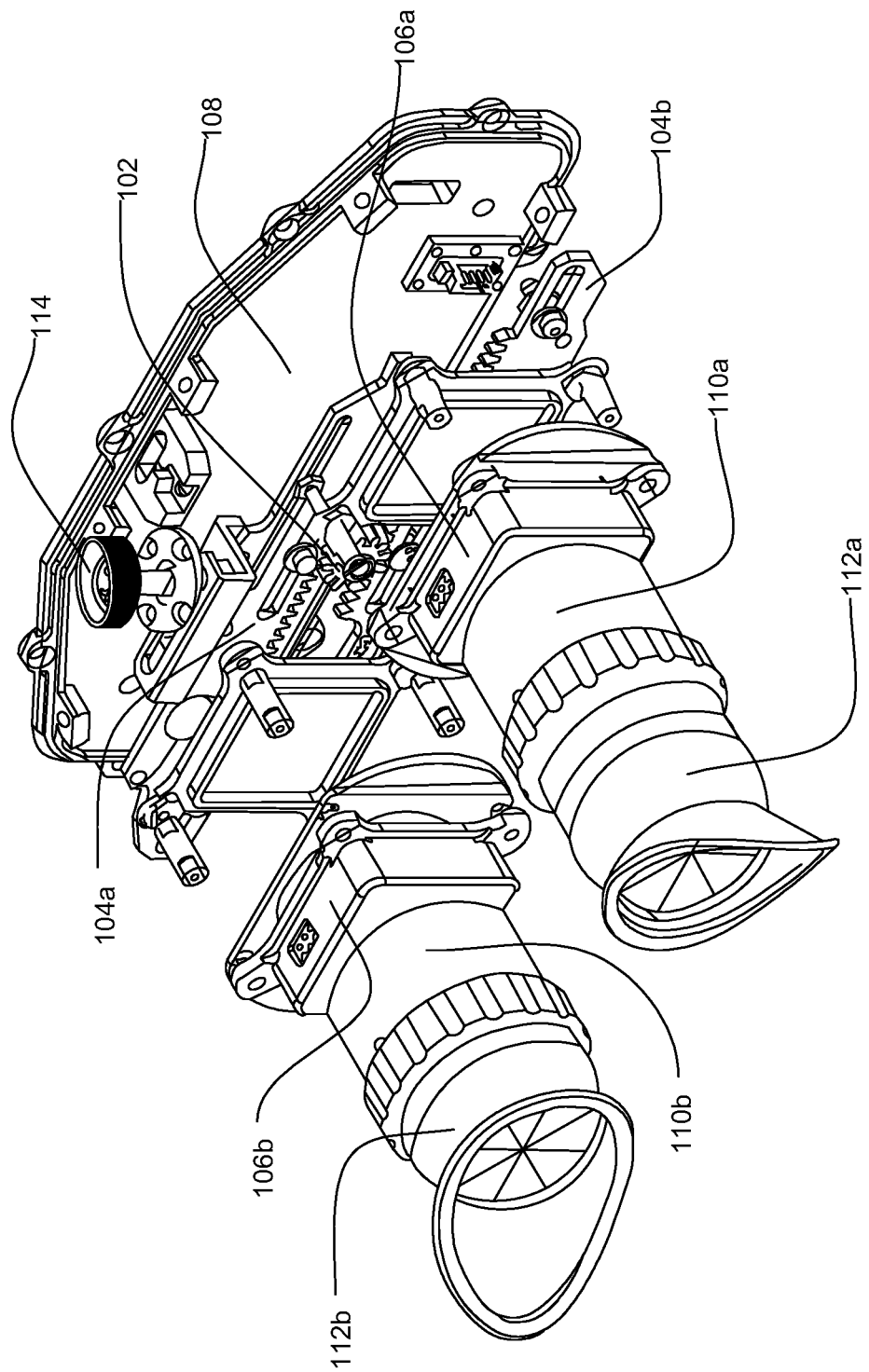
Figure 1C:
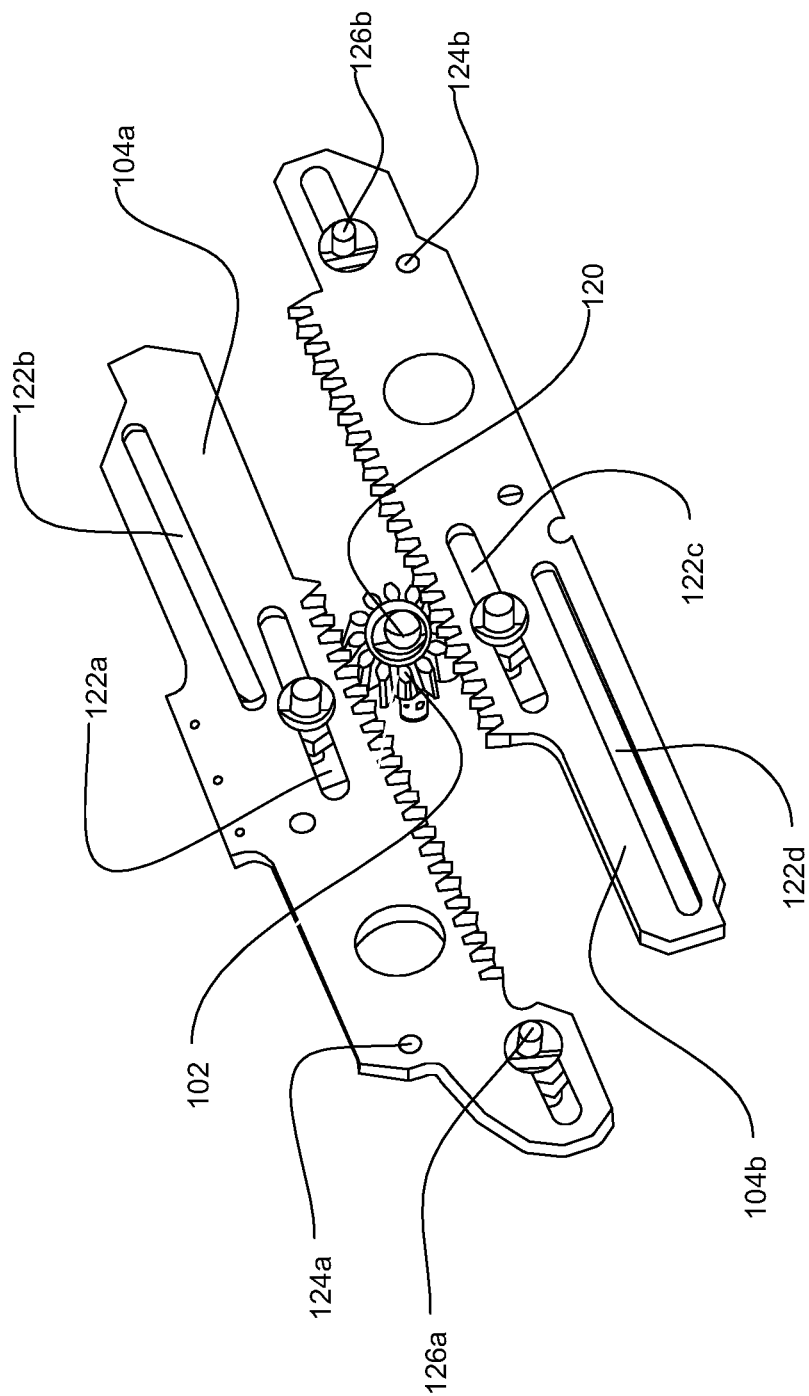
Figure 1D:
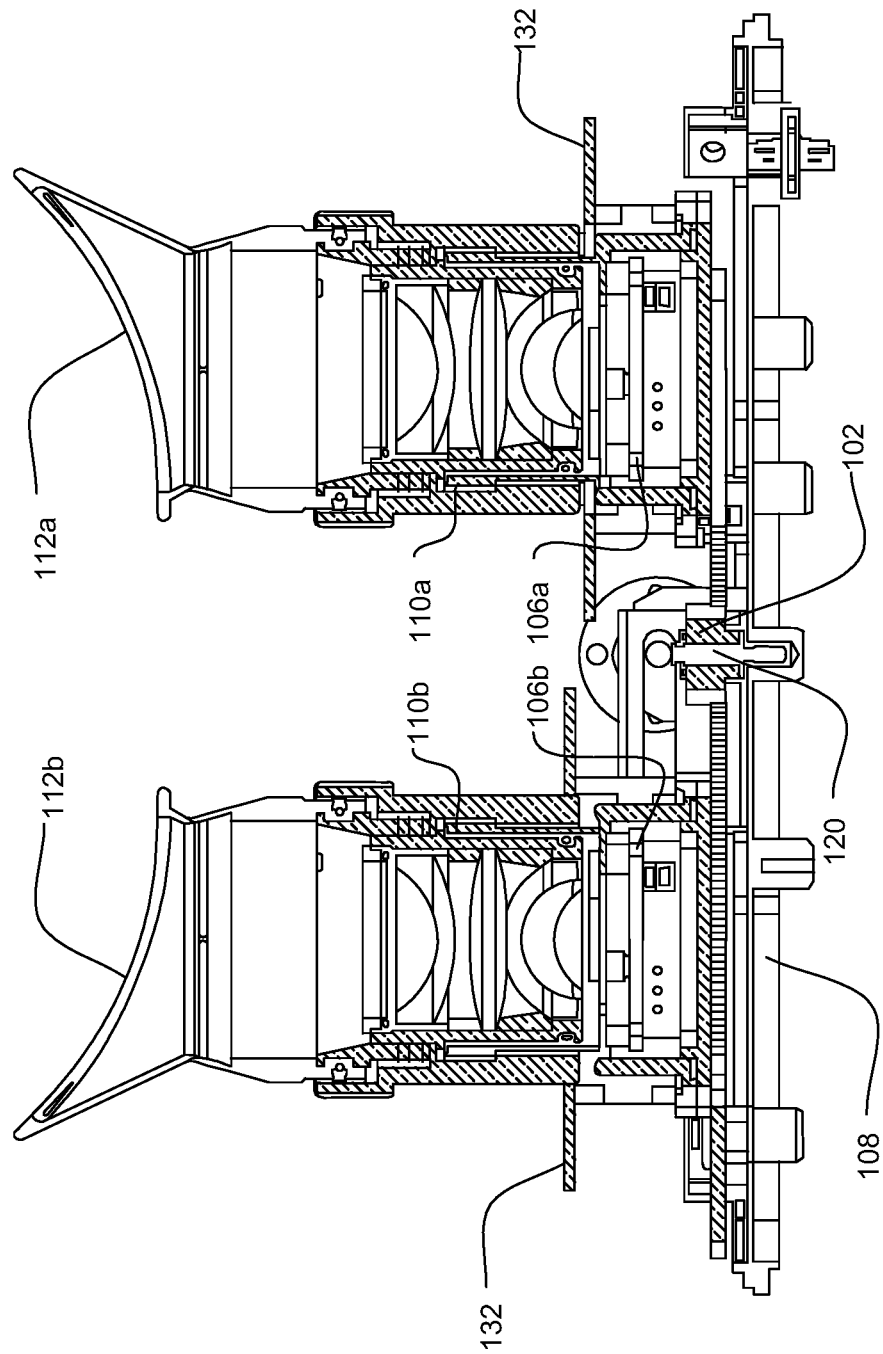
Figure 1E:
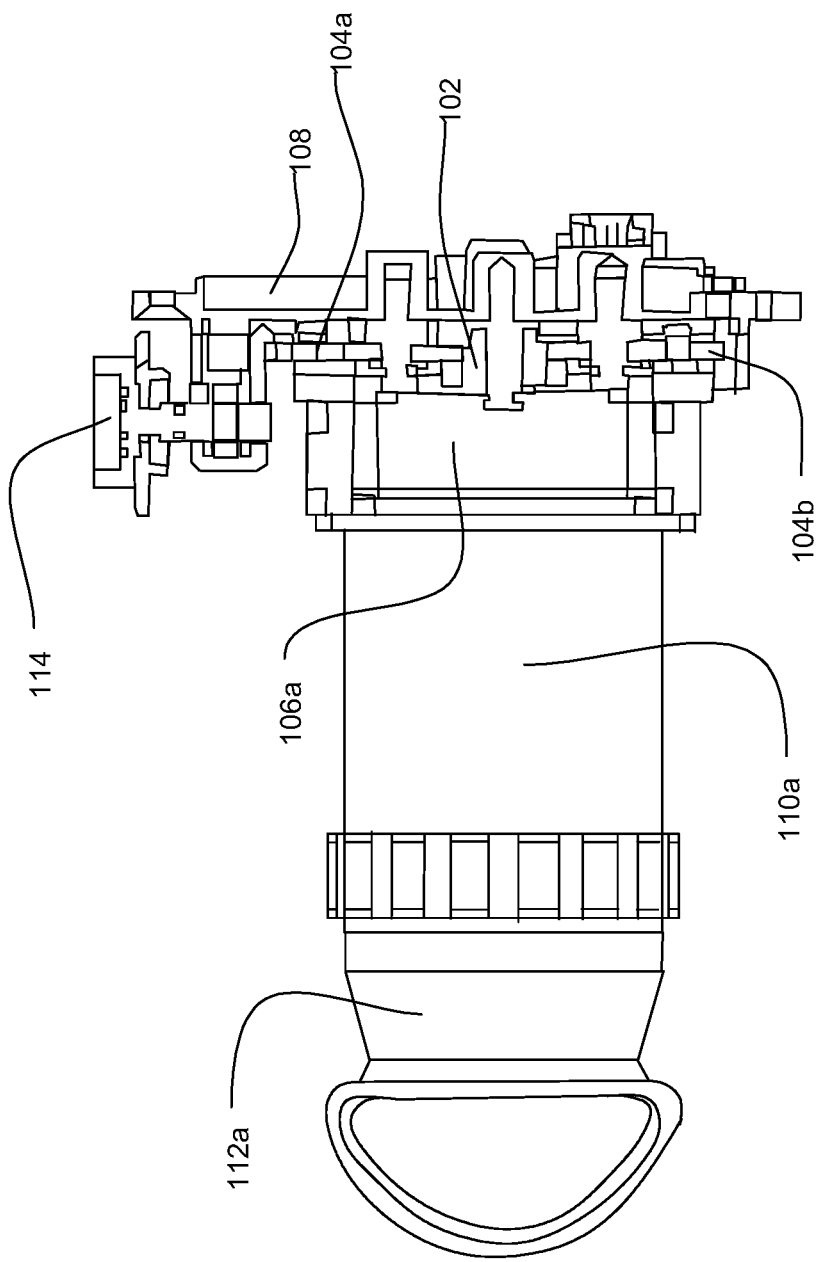
Figure 1F:
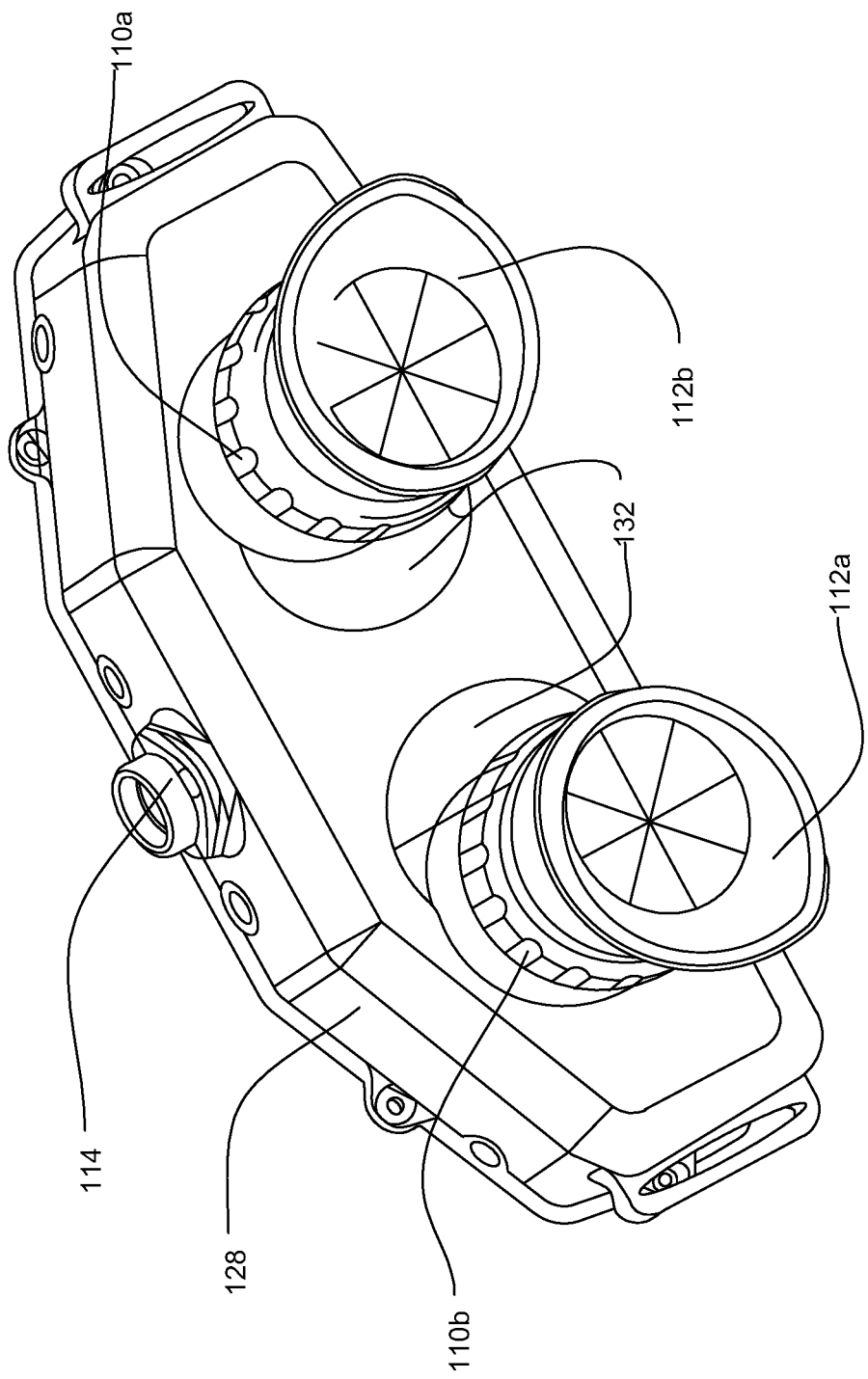
Figure 2:
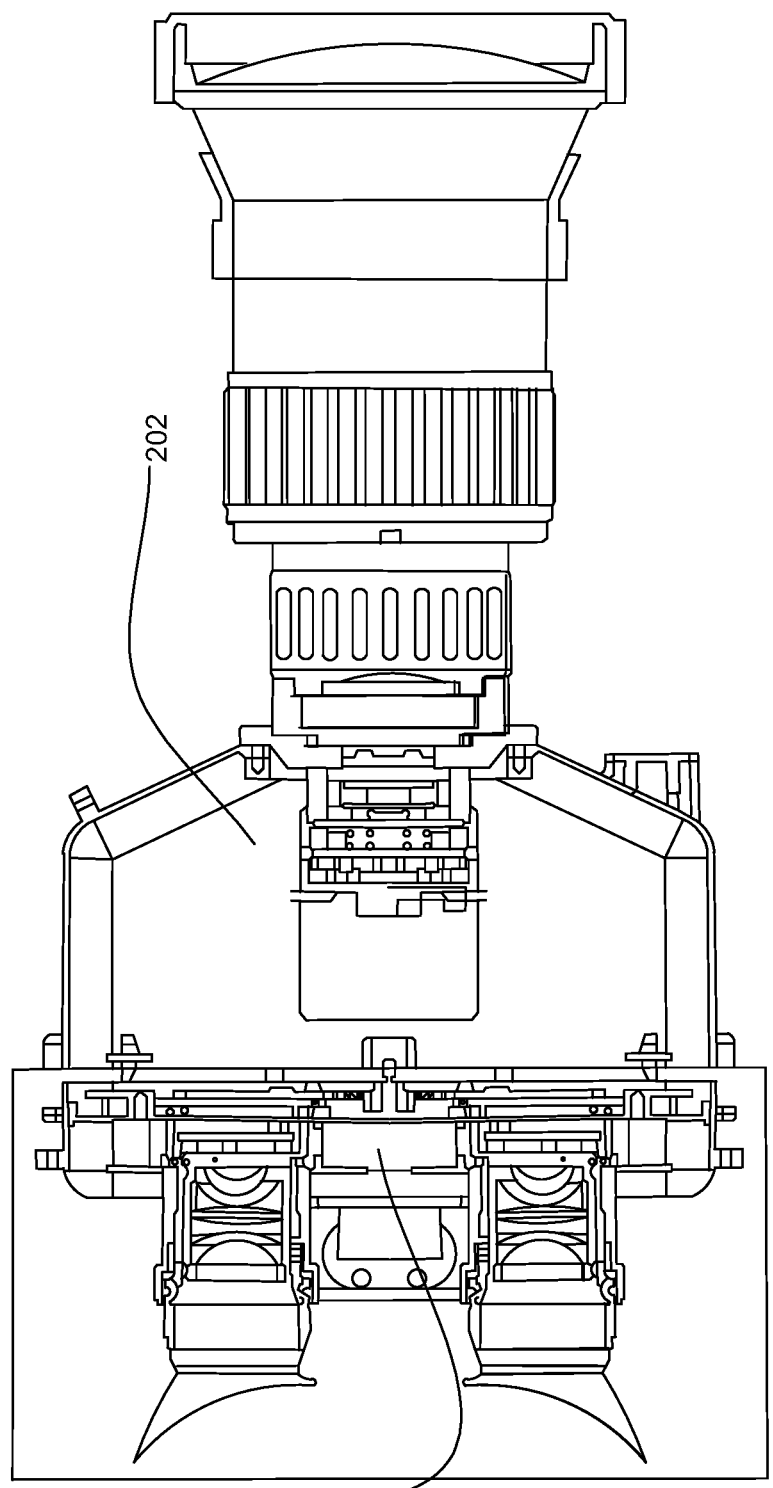

Having thus described the disclosure in general terms, reference will now be made to the accompanying figures, wherein;

FIG. 1A illustrates cross sectional view of a device for inter-pupillary distance adjustment between eyepieces in an imaging system, in accordance with various embodiments of the present disclosure;

FIG. 1B illustrates exploded view of the device of FIG. 1A, in accordance with various embodiments of the present disclosure;

FIG. 1C illustrates cross sectional view of assembly of a pinion gear with a plurality of carrier plates of the device of FIG. 1A, in accordance with an embodiment of the present disclosure;

FIG. 1D illustrates top view of the device of FIG. 1A, in accordance with various embodiments of the present disclosure;

FIG. 1E illustrates sectional view of mid-vertical plane of the device of FIG. 1A, in accordance with various embodiments of the present disclosure;

FIG. 1F illustrates cross sectional view of the device of FIG. 1A with a protective cover, in accordance with various embodiments of the present disclosure; and FIG. 2 illustrates top view of an assembly the device of FIG. 1A within an uncooled thermal imager, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1A illustrates cross sectional view of a device 100 for inter-pupillary distance adjustment between eyepieces of an imaging system, in accordance with various embodiments of the present disclosure. FIG. 1B illustrates exploded view of the device 100 of FIG. 1A, in accordance with various embodiments of the present disclosure. In general, inter-pupillary distance corresponds to distance between centers of pupils of eyes of an individual. The distance between an eyepiece of the imaging system or imaging device is adjusted to make the imaging system or imaging device suitable for use by different individuals with different distance between centers of pupils. The adjustment of distance between eyepieces of the imaging system is known as inter-pupillary distance adjustment. The device 100 enables the inter-pupillary distance adjustment between eyepieces of the imaging system without causing any skew. In general, skew corresponds to slanting or misalignment of images formed on the focal plane of an imaging system. The device 100 enables the inter-pupillary distance adjustment between eyepieces of the imaging system without causing any distortion in the image.

The device 100 includes a rack and pinion arrangement to ensure movement of focal plane arrays along with the corresponding telescopic element of the imaging system. The rack and pinion arrangement enables the movement of the focal plane arrays along a straight horizontal line. The straight line movement of the focal plane arrays results in elimination of skew or distortion in images formed on the focal plane of the imaging system. The device 100 enables a user to adjust inter-pupillary distance as per distance between eyes of the user. The device 100 enables the user to temporarily lock the inter-pupillary distance between eyepieces of the imaging system. The device 100 enables users to lock inter-pupillary distance between eyepiece at desired position. The device 100 enables symmetrical movement of the focal plane arrays. The device 100 eliminates skew or distortion caused by the inter-pupillary distance adjustment.

The device 100 includes a pinion gear 102, a plurality of carrier plates, a plurality of focal plane arrays 106a, b, and a support plate 108. In an embodiment of the present disclosure, the plurality of carrier plates includes two carrier plates 104a, b. In an embodiment of the present disclosure, the plurality of focal plane arrays includes two focal plane arrays 106a, b. Further, the device 100 includes a plurality of telescopic elements and a plurality of eyepieces. In an embodiment of the present disclosure, the plurality of telescopic elements includes two telescopic elements 110a, b and the plurality of eyepieces includes two eyepieces 112a, b. In addition, the device 100 includes a thumb screw 114 and a first pin 120. Also, each of the plurality of carrier plates includes a plurality of slots 122. In an embodiment of the present disclosure, the plurality of carrier plates corresponds to a first carrier plate 104a and a second carrier pate 104b. In an embodiment of the present disclosure, the plurality of focal plane arrays correspond to a first focal plane array 106a and a second focal plane array 106b. In an embodiment of the present disclosure, the plurality of telescopic elements corresponds to a first telescopic element 110a and a second telescopic element 110b. The above stated elements of the device 100 collectively enable inter-pupillary distance adjustment between eyepieces of the imaging system.

The device 100 includes the pinion gear 102. The pinion gear 102 includes a plurality of gear teeth on outer circular periphery. In general, pinion gear corresponds to a circular gear with teeth in mesh with one or more linear gears i.e. racks. Rotation of the pinion gear 102 provides rectilinear motion to focal plane arrays to enable inter-pupillary distance adjustment. The pinion gear 102 facilitates to provide rectilinear motion of desired magnitude to focal plane arrays. The pinion gear 102 facilitates to provide rectilinear motion in opposite directions to focal plane arrays to enable accurate inter-pupillary distance adjustment. The pinion gear 102 provides symmetrical movement to focal plane arrays in opposite directions. The pinion gear 102 is mounted on the first pin 120 of a plurality of pins. The pinion gear 102 rotates about a first axis. The first axis is along longitudinal axis of the first pin 120. The pinion gear 102 is free to rotate on the first pin 120.

In an embodiment of the present disclosure, the device 100 includes the two carrier plates 104a, b. In another embodiment of the present disclosure, there may be more number of carrier plates. In general, carrier plate corresponds to support plate for mounting various components in an assembly. The two carrier plates 104a, b are substantially identical in cross-sectional shape and size. Each of the two carrier plates 104a, b includes gear teeth on a first portion of a side. The first portion of the side of each of the two carrier plates 104a, b includes gear teeth. The gear teeth on the first portion of the side of each of the two carrier plates 104a, b are corresponding to gear teeth on the pinion gear 102. The gear teeth on the first portion of the side of each of the two carrier plates 104a, b acts as rack gear teeth. The gear teeth on the two carrier plates 104a, b are continuous in mesh with the pinion gear 102. The two carrier plates 104a, b acts as rack gears.

FIG. 1C illustrates cross sectional view of assembly of the pinion gear 102 with the two carrier plates 104a, b of the device 100 of FIG. 1A, in accordance with an embodiment of the present disclosure. The two carrier plates 104a, b are positioned parallel and opposite to one another. The gear teeth on the side on each of the two carrier plates 104a, b are in contact with the pinion gear 102 such that the two carrier plates 104a, b are opposite and parallel to one another. Upon rotation of the pinion gear 102, the pinion gear 102 provides rectilinear motion of equal magnitude to the two carrier plates 104a, b in opposite directions to one another. On rotation of the pinion gear 102, the two carrier plates 104a, b move by same magnitude in opposite directions parallel to one another. The pinion gear 102 provides symmetrical movement to the two carrier plates 104a, b in opposite directions. Each of the two carrier plates 104a, b includes the plurality of slots 122. In general, slot corresponds to a narrow opening or a slit in a body for receiving one or more components. The plurality of slots 122 on each of the two carrier plates 104a, b are for receiving one or more components.

The two carrier plates 104a, b corresponds to a first carrier plate 104a and a second carrier plate 104b. The first carrier plate 104a is substantially identical in cross sectional shape and size to the second carrier plate 104b. The first carrier plate 104a has the side with the gear teeth. The second carrier plate 104a has the side with the gear teeth. The first carrier plate 104a is positioned above the pinion gear 102. The gear teeth on the side of the first carrier plate 104a are above and in constant mesh with the pinion gear 102. The second carrier plate 104b is positioned below the pinion gear 102. The gear teeth on the side of the second carrier plate 104a are below and in constant mesh with the pinion gear 102. Upon rotation of the pinion gear 102, the first carrier plate 104a and the second carrier plate 104b move in opposite directions parallel to one another. The pinion gear 102 provides symmetrical movement to the first carrier plate 104a and the second carrier plate 104b in opposite directions. The pinion gear 102 enables the first carrier plate 104a and the second carrier plate 104b to move in opposite directions by exactly identical magnitude.

Each of the two carrier plates 104a, b includes the plurality of slots 122. The first carrier plate 104a includes a first slot 122a and a second slot 122b. The second carrier plate 104b includes a third slot 122c and a fourth slot 122d. The first slot 122a of the first carrier plate 104a and the third slot 122c of the second carrier plate 104b are guide elements for travel of inter-pupillary distance adjustment. In an embodiment of the present disclosure, the first slot 122a of the first carrier plate 104a and the third slot 122c of the second carrier plate 104b are employed for any suitable purpose of the like. The second slot 122b of the first carrier plate 104a and the fourth slot 122d of the second carrier plate 104b are support elements of focal plane arrays of the device 100. In an embodiment of the present disclosure, the second slot 122b of the first carrier plate 104a and the fourth slot 122d of the second carrier plate 104b are employed for any suitable purpose of the like. In an embodiment of the present disclosure, there may be more or less number of slots.

Each of the two carrier plates 104a, b includes the plurality of holes 124. In general, hole corresponds to a circular recess or cavity in a body. The first carrier plate 104a includes a first plurality of holes 124a. The second carrier plate 104b includes a second plurality of holes 124b. The first plurality of holes 124a facilitates to affix focal plane arrays on the first carrier plate 104a. In an embodiment of the present disclosure, the first plurality of holes 124a is employed for any suitable purpose of the like. The second plurality of holes 124b facilitates to affix focal plane arrays on the second carrier plate 104b. In an embodiment of the present disclosure, the second plurality of holes 124b is employed for any suitable purpose of the like.

In an embodiment of the present disclosure, the device 100 includes two focal plane arrays 106a, b. In general, focal plane corresponds to a plane through focus of an imaging device perpendicular to axis of a mirror or lens. The two focal plane arrays 106a, b are rectilinear focal plane arrays. Each of the two focal plane arrays 106a, b is rigidly affixed with a carrier plate of the two carrier plates 104a, b and movably supported over other carrier plate of the two carrier plates 104a, b. The two focal plane arrays corresponds to a first focal plane array 106a and a second focal lane array 106b. The first focal plane array 106a is rigidly affixed with the first carrier plate 104a. The first focal plane array 106a is bolted rigidly in the first plurality of holes 124a of the first carrier plate 104a.

Each of the two focal plane arrays 106a, b includes one or more pins on a first side. The one or more pins on each of the two focal plane arrays 106a, b is received in a slot of the plurality of slots 122 of a carrier plate of the two carrier plates 104a, b. The first focal plane array 106a is supported with facilitation of the one or more pins in the fourth slot 122d of the second carrier plate 104b. The first focal plane array 106a is free to slide in the fourth slot 122d of the second carrier plate 104b for inter-pupillary distance adjustment. Length of the fourth slot 122d of the second carrier plate 104b determines total travel of inter-pupillary distance adjustment.

As the first carrier plate 104a moves, the first focal plane array 106a moves with the first carrier plate 104a. The first focal plane array 106a moves with the first carrier plate 104a and slides in the second carrier plate 104b. The second focal plane array 106b is rigidly affixed with the second carrier plate 104b. The second focal plane array 106b is bolted rigidly in the second plurality of holes 124b of the second carrier plate 104b. The second focal plane array 106a, b includes sliding pins. The second focal plane array 106b is supported with facilitation of the one or more pins in the second slot 122b of the first carrier plate 104a. The second focal plane array 106b is free to slide in the second slot 122b of the first carrier plate 104a for inter-pupillary distance adjustment. Length of the second slot 122b of the first carrier plate 104a determines total travel of inter-pupillary distance adjustment. Upon movement of the second carrier plate 104b, the second focal plane array 106b moves with the second carrier plate 104b. The second focal plane array 106b moves with the first carrier plate 104b and slides in the second carrier plate 104a.

The device 100 includes the support plate 108. The support plate 108 provides mechanical support to a plurality of elements of the device 100. In general, support plate corresponds to rigid structural element to provide mechanical support to various elements of an assembly. The support plate 108 includes a plurality of pins 126. Each of the plurality of pins 126 is received in a slot of the plurality of slots 122 of a carrier plate of the plurality of carrier plates. The plurality of pins 126 of the support plate 108 are received in a slot of a carrier plate of the two carrier plates 104a, b. The plurality of pins 126 of the support plate 108 and the plurality of slots 122 of the two carrier plates 104a, b acts as guide elements for inter-pupillary distance adjustment. The support plate 108 includes the first pin 120. The first pin 120 is rigidly affixed on the support plate 108. The pinion gear 102 is mounted on the first pin 120. The pinion gear 102 freely rotates on the first pin 120.

The support plate 108 includes the plurality of pins 126. The plurality of pins 126 include a first pin 126a and a second pin 126b. The first slot 122a of the first carrier plate 104a receives the first pin 126a of the plurality of pins 126. The first pin 126a and the first slot 122a collectively act as guide elements of the first carrier plate 104a for the inter-pupillary distance adjustment. The first pin 126a slides freely in the corresponding first slot 122a of the first carrier plate 104a. The first pin 126a provides mechanical support to the first carrier plate 104a. In addition, the first pin 126a enables the first carrier plate 104a to reciprocate freely on rotation of the pinion gear 102. In an embodiment of the present disclosure, the first pin 126a is employed for any suitable purpose of the like.

The third slot 122c of the second carrier plate 104b receives the second pin 126b. The second pin 126b and the third slot 122c collectively act as guide elements of the second carrier plate 104b for the inter-pupillary distance adjustment. The second pins 126b slides freely in the corresponding third slot 122c of the second carrier plate 104b. The second pin 126b provides mechanical support to the second carrier plate 104b. The second pin 126b enables the second carrier plate 104b to reciprocate freely on rotation of the pinion gear 102. In an embodiment of the present disclosure, the second pin 126b is employed for any suitable purpose of the like. In an embodiment of the present disclosure, there may be more or less number of pins.

FIG. 1D illustrates top view of the device 100 of FIG. 1A, in accordance with various embodiments of the present disclosure. In an embodiment of the present disclosure, the device 100 includes two telescopic elements 110a, b. Each of the two telescopic elements 110a, b is mounted on one focal plane array of the two focal plane arrays 106a, b. The two telescopic elements 110a, b corresponds to a first telescopic element 110a and a second telescopic element 110b. The first telescopic element 110a is mounted on the first focal plane array 106a. The second telescopic element 110b is mounted on the second focal plane array 106b. In an embodiment of the present disclosure, the two telescopic elements 110a, b are mounted at any suitable position of the like. The two telescopic elements 110a, b facilitates to connect the two focal plane arrays 106a, b with eyepiece of the device 100. The two telescopic elements 110a, b facilitates to form an image of the distant object on the eyepiece of the device 100. In an embodiment of the present disclosure, the two telescopic elements 110a, b is employed for any suitable purpose of the like.

In an embodiment of the present disclosure, the device 100 includes two eyepieces 112a, b. Each of the two eyepieces 112a, b is mounted on one telescopic element of the two telescopic elements 110a, b. The two eyepieces 112a, b corresponds to a first eyepiece 112a and a second eyepiece 112b. The first eyepiece 112a is mounted on the first telescopic element 110a. The second eyepiece 112b is mounted on the second telescopic element 110b. In an embodiment of the present disclosure, the two eyepieces 112a, b is mounted on any suitable locations of the like. In general, eyepieces correspond to a component that is closest to the eyes of users when someone is looking through the imaging device.

FIG. 1E illustrates sectional view of mid-vertical plane of the device 100 of FIG. 1A, in accordance with various embodiments of the present disclosure. The first eyepiece 112a is rigidly affixed with the first telescopic element 110a and the first telescopic element 110a is rigidly affixed with the first focal plane array 106a. The first focal plane array 106a is rigidly affixed with the first carrier plate 104a. As the first carrier plate 104a is moved for the inter pupillary distance adjustment; the first focal plane array 106a, the first telescopic element 110a and the first eyepiece 112a move along with the first carrier plate 104a. The first carrier plate 104a, the first focal plane array 106a, the first telescopic element 110a and the first eyepiece 112a are rigidly affixed connected and move together as a single unit during inter-pupillary distance adjustment. The second eyepiece 112b is rigidly affixed with the second telescopic element 110b and the second telescopic element 110b is rigidly affixed with the second focal plane array 106b. The second focal plane array 106b is rigidly affixed with the second carrier plate 104b. As the second carrier plate 104b is moved for the inter pupillary distance adjustment; the second focal plane array 106b, the second telescopic element 110b and the second eyepiece 112b move along with the second carrier plate 104b. The second carrier plate 104b, the second focal plane array 106b, the second telescopic element 110b and the second eyepiece 112b are rigidly affixed connected and move together as a single unit during the inter-pupillary distance adjustment.

Further, the device 100 includes the thumb screw 114. The thumb screw 114 is employed to lock the inter-pupillary distance adjustment at any desired position. The thumb screw 114 is bolted into the device 100 to lock the inter-pupillary distance at desired position. The thumb screw 114 is positioned at top of the device 100. The thumb screw 114 is characterized by a longitudinal axis. The longitudinal axis of the thumb screw 114 is along length of the thumb screw 114. The thumb screw 114 is rotated about the longitudinal axis to lock the inter-pupillary distance at desired position.

FIG. 1F illustrates a cross sectional view of the device 100 with a protective cover 128, in accordance with an embodiment of the present disclosure. The protective cover 128 includes two oval shaped slots on a face as provision for the two eyepieces 112a, b to protrude out as much as required. In an embodiment of the present disclosure, the two oval shaped slots are provided with shutters 132. The shutters 132 are steadily connected over the two focal plane arrays 106a, b using spacers. The shutters 132 according to individual applications provide various degrees of protection against reaching the internal components of the inter-pupillary mechanism that resides inside the protective cover 128.

FIG. 2 illustrates a top view of an assembly 200 of the device 100 within an uncooled thermal imager 202, in accordance with an embodiment of the present disclosure. FIG. 2 illustrates the assembly 200 of the device 100 within the uncooled thermal imager 202, as an example for implementing the device 100 in a plurality of imaging systems. In fact, the invention has also been successfully incorporated so far, in more advanced imaging systems and thermal imagers containing a number of various sensors such as, thermal cameras, daylight cameras, light tube intensifiers, laser range finders, and laser illuminators. In an embodiment of the present disclosure, the plurality of imaging systems includes any suitable imaging systems of the like. The device 100 provides satisfactory testing results for all different configurations.

The device 100 enables the inter-pupillary distance adjustment by pushing the two eyepieces 112a, b in desired direction without applying any additional leverage. The inter-pupillary distance of the device 100 is easily adjusted by applying force with hands of a user. The device 100 adjusts the inter-pupillary distance such that orientation of the two focal plane arrays 106a, b is always parallel to one another. In addition, while a rack and pinion arrangement is discussed, other mechanical or electromechanical linkages which move the two eyepieces 112a, b such that the associated focal plane arrays are parallel, are within the subject matter of this invention. In an embodiment of the present disclosure, the device 100 enables movement of one of a telescopic element and associated eyepiece with respect to a fixed telescopic element and eyepiece such that the associated focal plane arrays maintain their parallel orientation during the inter-pupillary distance adjustment. The device 100 does not require vertical movement of the two eyepieces 112a, b because the viewing area inside the device 100 is axisymmetric and does not include electronic display. The device 100 does not rotate or distort the imagery because the two focal plane arrays 106a, b remains parallel. Furthermore, the device 100 provides smooth operation throughout travel of the inter-pupillary distance adjustment. In an embodiment the present disclosure, the device 100 is designed to meet needs of thermal infrared (IR) imaging; however, it is applicable to other viewing systems.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed:

1. A device for adjusting inter-pupillary distance between eyepieces, the device comprising:
a pinion gear, wherein the pinion gear is mounted on a first pin of a plurality of pins, wherein the pinion gear rotates about a first axis;
a plurality of carrier plates, wherein each of the plurality of carrier plates having gear teeth on a first portion of a side, wherein the gear teeth on the plurality of carrier plates are in mesh with the pinion gear;
a plurality of focal plane arrays, wherein each of the plurality of focal plane arrays are rigidly affixed with a first carrier plate of the plurality of carrier plates and movably supported over a second carrier plate of the plurality of carrier plates; and
a support plate for supporting the pinion gear;
wherein the device enables inter-pupillary distance adjustment between eyepieces without causing skew or distortion of image.

2. The device as recited in claim 1, wherein the plurality of carrier plates are positioned parallel and opposite to one another, wherein rotation of the pinion gear provides rectilinear motion of same magnitude to the plurality of carrier plates in opposite direction to one another.

3. The device as recited in claim 1, wherein each of the plurality of carrier plates comprises a plurality of slots.

4. The device as recited in claim 1, wherein the support plate comprises a plurality of pins, wherein each of the plurality of pins is received in a slot of a plurality of slots of a carrier plate of the plurality of carrier plates.

5. The device as recited in claim 1, further comprising a plurality of telescopic elements, wherein each of the plurality of telescopic elements is mounted on a focal plane array of the plurality of focal plane arrays.

6. The device as recited in claim 5, further comprising a plurality of eyepieces, wherein each of the plurality of eyepieces is mounted on a telescopic element of the plurality of telescopic elements, wherein the device enables inter-pupillary distance adjustment by pushing the plurality of eyepieces in desired direction without applying any additional leverage.

7. The device as recited in claim 1, wherein each of the plurality of carrier plates comprises a plurality of slots, wherein length of the plurality of slots on each of the plurality of carrier plates determines total travel of inter-pupillary distance adjustment, wherein each of the plurality of carrier plates comprises a plurality of holes.

8. The device as recited in claim 1, wherein the plurality of carrier plates comprises a first carrier plate and a second carrier plate, wherein the plurality of focal plane arrays comprises a first focal plane array and a second focal plane array, wherein at least one side of the first focal plane array and at least one side of the second focal plane array lies along a straight horizontal line.

9. The device as recited in claim 1, further comprising a thumb screw, wherein the thumb screw facilitates to lock inter-pupillary distance between the eyepieces at desired position.

10. The device as recited in claim 1, wherein the plurality of pins and a plurality of slots in each of the plurality of carrier plates collectively enable limits of inter-pupillary distance adjustment, wherein the first pin of the plurality of pins is rigidly affixed on the support plate.

11. The device as recited in claim 1, wherein each of the plurality of focal plane arrays comprises one or more pins on a first side, wherein the one or more pins on each of the plurality of focal plane arrays is received in a slot of a plurality of slots of a carrier plate of the plurality of carrier plates.

12. A device for adjusting inter-pupillary distance between eyepieces, the device comprising:
- a pinion gear, wherein the pinion gear is mounted on a first pin of a plurality of pins, wherein the pinion gear rotates about a first axis;
- a plurality of carrier plates, wherein each of the plurality of carrier plates having gear teeth on a first portion of a side, wherein the gear teeth on the plurality of carrier plates are in mesh with the pinion gear, wherein the plurality of carrier plates are positioned parallel and opposite to one another, wherein rotation of the pinion gear provides rectilinear motion of same magnitude to the plurality of carrier plates in opposite direction to one another and wherein each of the plurality of carrier plates comprises a plurality of slots;
- a plurality of focal plane arrays, wherein each of the plurality of focal plane arrays are rigidly affixed with a first carrier plate of the plurality of carrier plates and movably supported over a second carrier plate of the plurality of carrier plates;
- a plurality of telescopic elements, wherein each of the plurality of telescopic elements is mounted on a focal plane array of the plurality of focal plane arrays; and
- a support plate for supporting the pinion gear, wherein the support plate comprises a plurality of pins, wherein each of the plurality of pins is received in a slot of the plurality of slots of a carrier plate of the plurality of carrier plates,
    wherein the device enables inter-pupillary distance adjustment between eyepieces without causing skew or distortion of image.

13. The device as recited in claim 12, further comprising a plurality of eyepieces, wherein each of the plurality of eyepieces is mounted on a telescopic element of the plurality of telescopic elements, wherein the device enables inter-pupillary distance adjustment by pushing the plurality of eyepieces in desired direction without applying any additional leverage.

14. The device as recited in claim 1, wherein length of the plurality of slots on each of the plurality of carrier plates determines total travel of inter-pupillary distance adjustment, wherein each of the plurality of carrier plates comprises a plurality of holes.

15. The device as recited in claim 1, wherein the plurality of carrier plates comprises a first carrier plate and a second carrier plate, wherein the plurality of focal plane arrays comprises a first focal plane array and a second focal plane array, wherein at least one side of the first focal plane array and at least one side of the second focal plane array lies along a straight horizontal line.

16. The device as recited in claim 1, further comprising a thumb screw, wherein the thumb screw facilitates to lock inter-pupillary distance between the eyepieces at desired position.

17. The device as recited in claim 1, wherein the plurality of pins and the plurality of slots in each of the plurality of carrier plates collectively enable limits of inter-pupillary distance adjustment, wherein the first pin of the plurality of pins is rigidly affixed on the support plate.

18. The device as recited in claim 1, wherein each of the plurality of focal plane arrays comprises one or more pins on a first side, wherein the one or more pins on each of the plurality of focal plane arrays is received in a slot of a plurality of slots of a carrier plate of the plurality of carrier plates.

* * * * *